(12) United States Patent
Mermoud et al.

(10) Patent No.: US 12,647,334 B2
(45) Date of Patent: Jun. 2, 2026

(54) USING NETWORK WATERFALL DATA TO ASSESS THE QoE OF WEB-BASED APPLICATIONS

(71) Applicant: Cisco Technology, Inc., San Jose, CA (US)

(72) Inventors: Grégory Mermoud, Venthône (CH); Pierre-André Savalle, Rueil-Malmaison (FR); Jean-Philippe Vasseur, Combloux (FR); Grégoire Magendie, Lamorlaye (FR); Michal Wladyslaw Garcarz, Cracow (PL)

(73) Assignee: Cisco Technology, Inc., San Jose, CA (US)

(*) Notice: Subject to any disclaimer, the term of this patent is extended or adjusted under 35 U.S.C. 154(b) by 199 days.

(21) Appl. No.: 18/103,040

(22) Filed: Jan. 30, 2023

(65) Prior Publication Data

US 2024/0259281 A1     Aug. 1, 2024

(51) Int. Cl.
H04L 41/5067 (2022.01)
G06F 16/95 (2019.01)

(52) U.S. Cl.
CPC .......... H04L 41/5067 (2013.01); G06F 16/95 (2019.01)

(58) Field of Classification Search
CPC .............................. H04L 41/5067; G06F 16/95
See application file for complete search history.

(56) References Cited

U.S. PATENT DOCUMENTS

| | | | |
|---|---|---|---|
| 10,146,395 B2 | 12/2018 | Hui et al. | |
| 10,177,999 B2 | 1/2019 | Broda et al. | |
| 10,958,546 B2 | 3/2021 | Jain et al. | |
| 2012/0246310 A1* | 9/2012 | Broda ................... | G06T 11/206 |
| | | | 709/224 |
| 2020/0213211 A1* | 7/2020 | Jain ......................... | H04L 43/08 |
| 2022/0027431 A1 | 1/2022 | Zheng et al. | |
| 2022/0278889 A1* | 9/2022 | Malleshaiah ........... | H04L 67/51 |

OTHER PUBLICATIONS

Shi, et al., "World of Bits: An Open-Domain Platform for Web-Based Agents", Proceedings of the 34th International Conference on Machine Learning, 2017, 10 Pages, Sydney, Australia.
Vaswani, et al., "Attention is All You Need", 31st Conference on Neural Information Processing Systems (NIPS 2017), 2017, 11 pages, Long Beach, CA, USA.

(Continued)

*Primary Examiner* — Umar Cheema
(74) *Attorney, Agent, or Firm* — Lee & Hayes, P.C.

(57) ABSTRACT

In one embodiment, a device obtains browser waterfall data from a web browser of a client that is used to access an online application via a network. The device obtains user feedback from the client indicative of whether a user of the client is satisfied with their experience with the online application. The device trains, using the browser waterfall data and user feedback as training data, a prediction model to predict a quality of experience metric for the online application. The device causes an adjustment to the network based on a prediction by the prediction model.

16 Claims, 9 Drawing Sheets

(56)           References Cited

OTHER PUBLICATIONS

Devlin,et al., "BERT: Pre-training of Deep Bidirectional Transformers for Language Understanding", Proceedings of NAACL-HLT 2019, pp. 4171-4186, Minneapolis, Minnesota, Jun. 2-Jun. 7, 2019, Association for Computational Linguistics.

Zbontar, et al., "Barlow Twins: Self-Supervised Learning via Redundancy Reduction", Proceedings of the 38th International Conference on Machine Learning, PMLR 139, Mar. 2021, 14 pages.

Baevski, et al., "data2vec: A General Framework for Self-supervised Learning in Speech, Vision and Language", online: https://doi.org/10.48550/arXiv.2202.03555, Oct. 2022, 15 pages.

Bocchi, et al., "Measuring the Quality of Experience of Web users", Internet—QoE, Aug. 22-26, 2016, pp. 37-42, Florianópolis , Brazil, ACM.

Varvello, et al., "Eyeorg: A Platform for Crowdsourcing Web Quality of Experience Measurements", CoNEXT '16, Dec. 12-15, 2016, 14 pages, Irvine, CA, ACM.

Salutari, et al., "Analyzing Wikipedia Users' Perceived Quality of Experience: A Large-Scale Study (Extended Technical Report)", IEEE Transactions on Network and Service Management ( vol. 17, Issue: 2, Jun. 2020), pp. 1082-1095.

Gal, et al., "Dropout as a Bayesian Approximation: Representing Model Uncertainty in Deep Learning", Proceedings of the 33 rd International Conference on Machine Learning, New York, NY, USA, 2016. JMLR: W&Cp vol. 48, 12 pages.

Mullachery, et al., "Bayesian Neural Networks", online: https://arxiv.org/ftp/arxiv/papers/1801/1801.07710.pdf, Jan. 2018, 16 pages.

"Workday", online: https://www.workday.com/, accessed Jan. 24, 2023, 5 pages.

"Microsoft 365", online: https://www.office.com/, accessed Jan. 24, 2023, 6 pages.

"Github", online: https://github.com/, accessed Jan. 24, 2023, 12 pages.

Jahromi, et al., "Beyond First Impressions: Estimating Quality of Experience for Interactive Web Applications", IEEE Access, vol. 8, Mar. 2020, pp. 47741-47755.

* cited by examiner

400

SDN CONTROLLER
408

SD-WAN
FABRIC
404

SD-WAN
SERVICE POINT
406

110b

110a

LAN CORE
402

USING NETWORK WATERFALL DATA TO ASSESS THE QoE OF WEB-BASED APPLICATIONS

TECHNICAL FIELD

The present disclosure relates generally to computer networks, and, more particularly, to using network waterfall data to assess the quality of experience (QoE) of web-based applications.

BACKGROUND

With the recent evolution of machine learning, predictive failure detection and proactive routing in a network now becomes possible through the use of machine learning techniques. For instance, modeling the delay, jitter, packet loss, etc. for a network path can be used to predict when that path will violate the service level agreement (SLA) of the application and reroute the traffic, in advance. However, doing so is also not without cost, as needlessly rerouting application traffic can also negatively impact the application experience of a user.

Traditionally, SLA thresholds have been used as a proxy for the true quality of experience (QoE) of an online application from the perspective of the end user. In other words, it is assumed that if the SLA is being violated, the QoE of the application is also degraded. While this may hold true in clear situation of network impairment, some of the more complex types of impairments could go unnoticed by network systems because of the specificity of the impairment definition or because of other factors that limit visibility to such impairments.

Assessing the QoE of web-based applications is extremely difficult, as they often feature many different workflows, each triggering very different actions and fulfilling different objectives. For instance, even performing a simple task in an online application often involves multiple user interactions, and can be done using a variety of approaches, each involving different resources to be fetched by the browser (e.g., via Quick Tasks from the homepage, via the Search field, or via the Menu). Often, the experience of a user in this context is highly dependent on the chosen workflow, how quickly resources can be fetched (which may depend on caching as well), and/or other factors.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
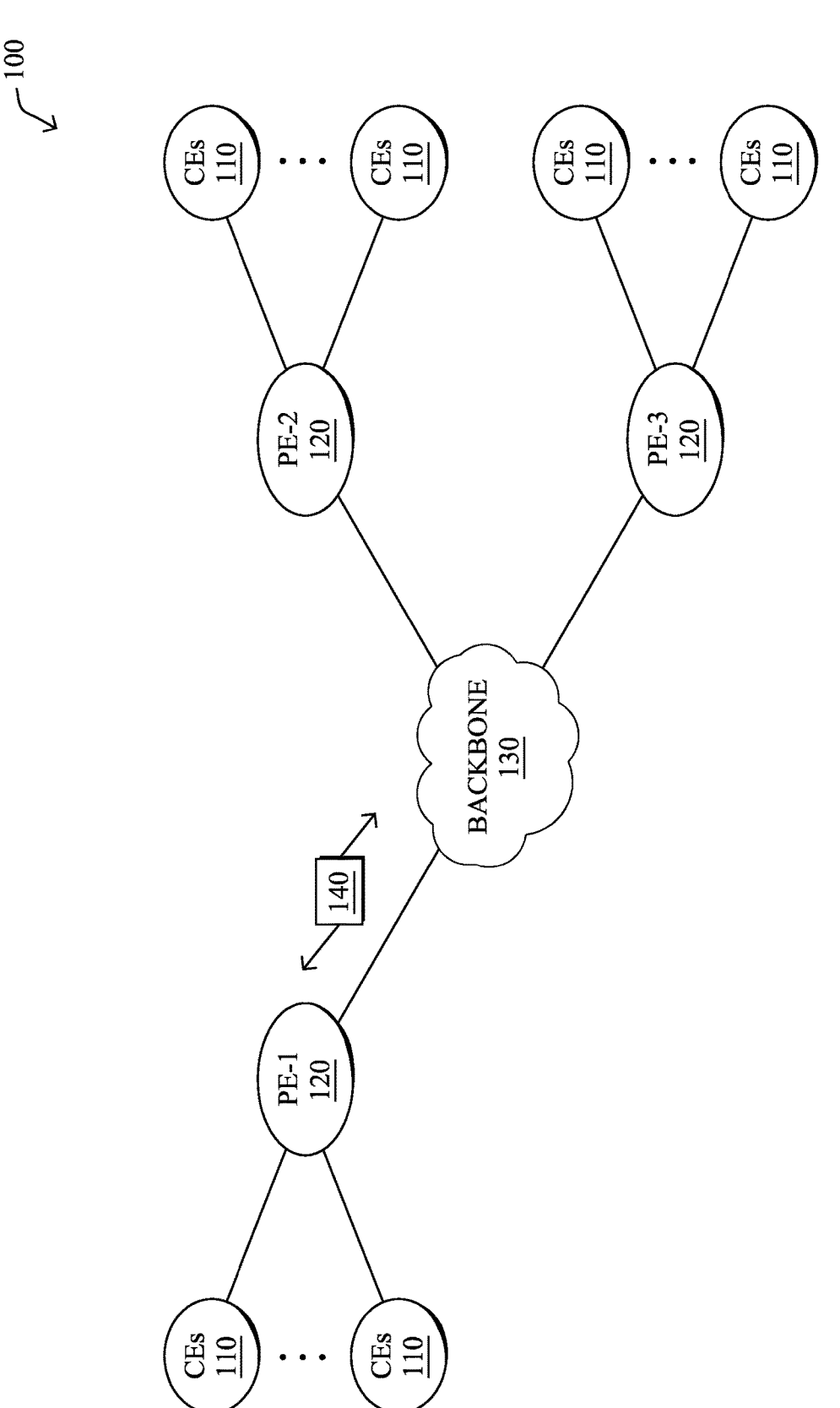
FIGS. 1A-1B illustrate an example communication network.

According to one or more embodiments of the disclosure, a device obtains browser waterfall data from a web browser of a client that is used to access an online application via a network. The device obtains user feedback from the client indicative of whether a user of the client is satisfied with their experience with the online application. The device trains, using the browser waterfall data and user feedback as training data, a prediction model to predict a quality of experience metric for the online application. The device causes an adjustment to the network based on a prediction by the prediction model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
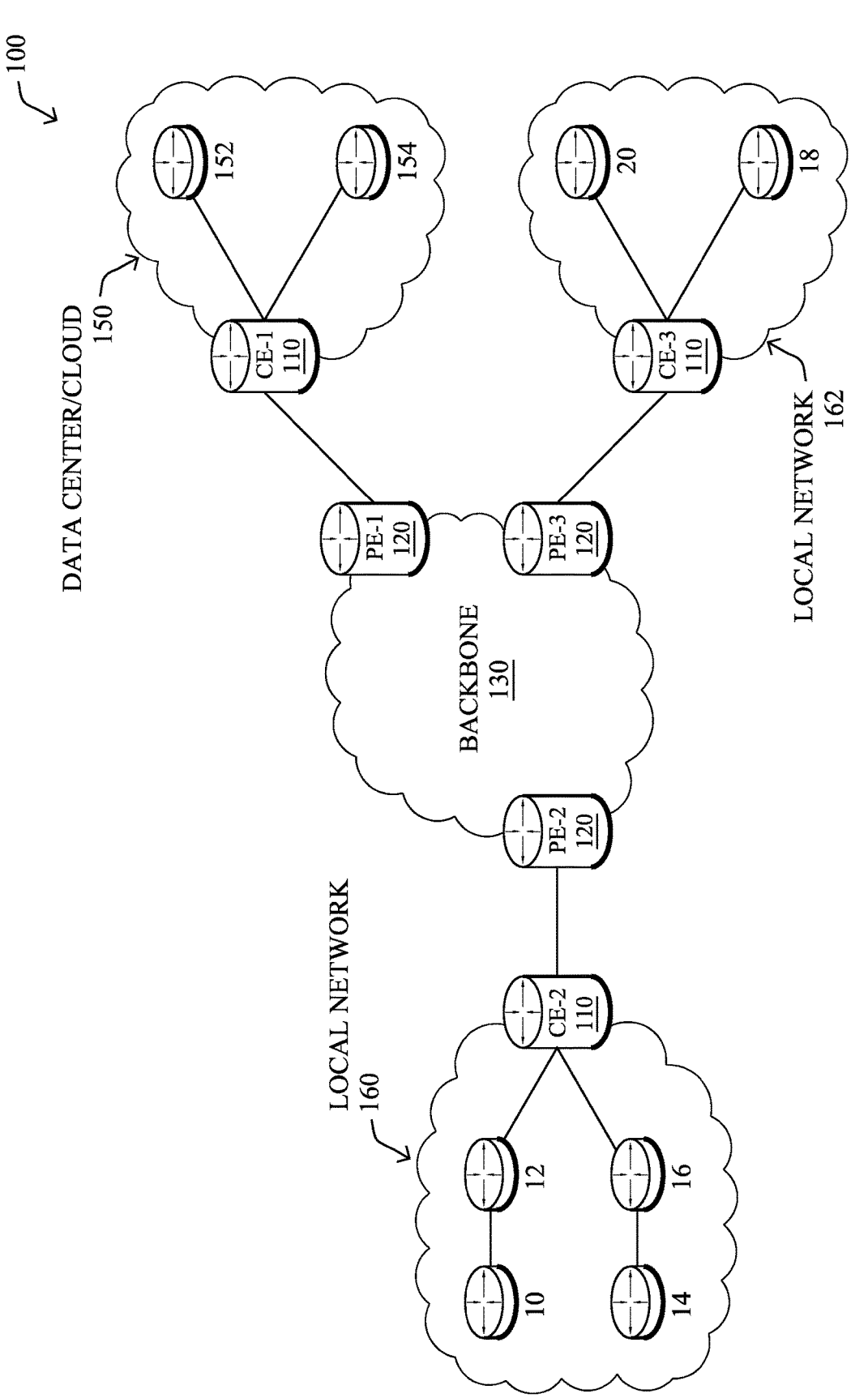

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
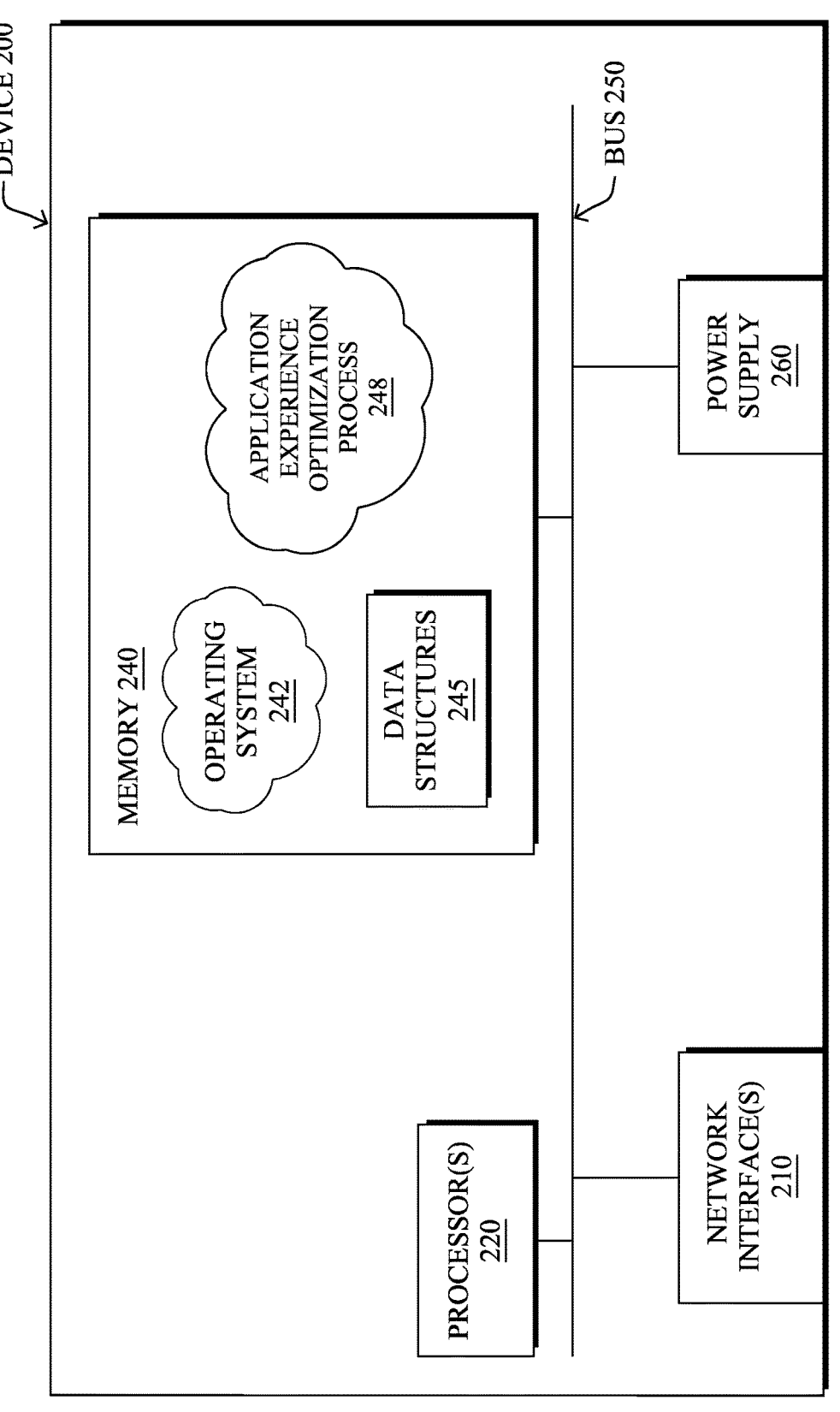
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 and/or data denoising process may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision.

Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
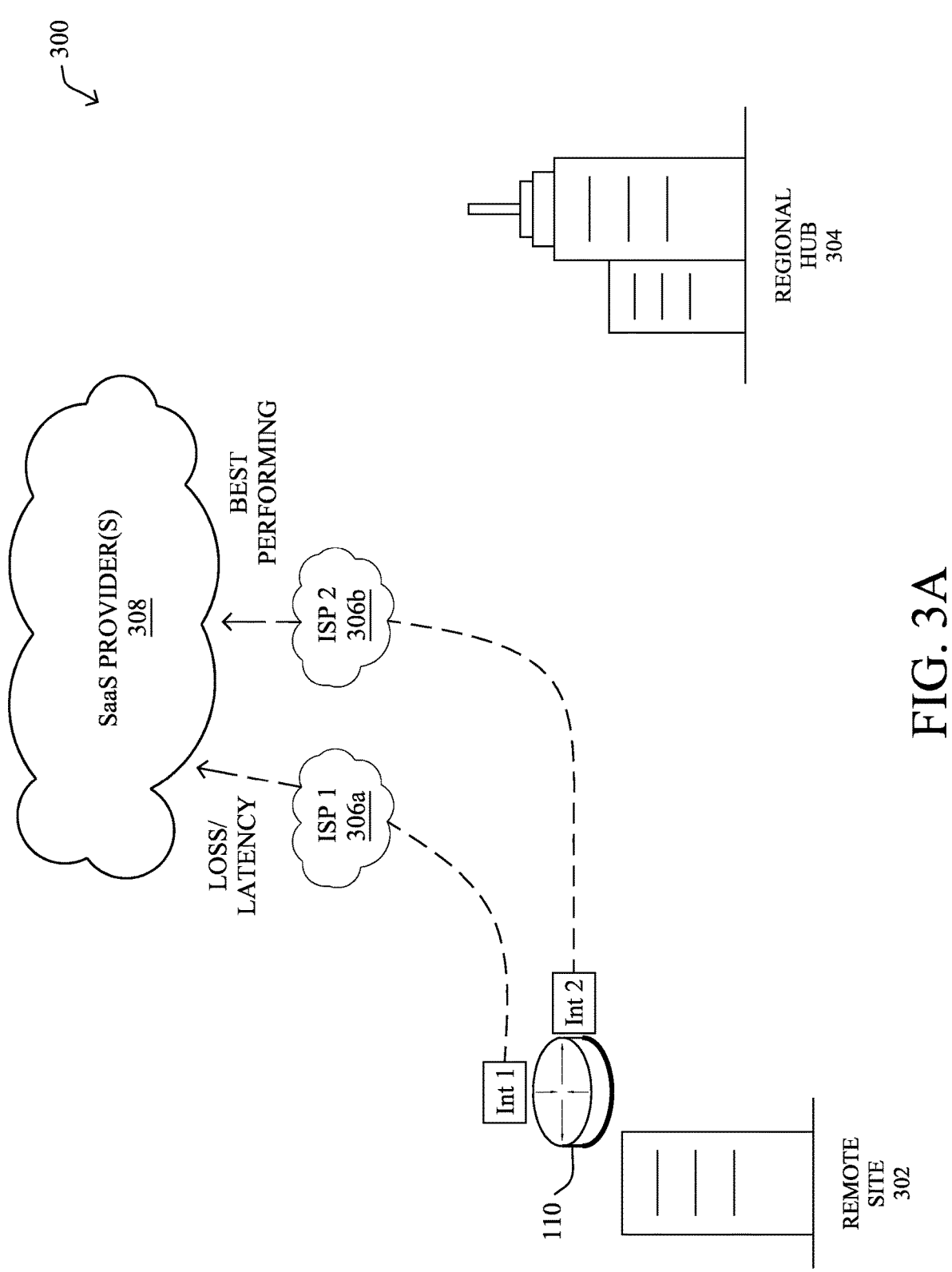
FIGS. 3A-3B illustrate example network deployments.
Figure 3B:

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
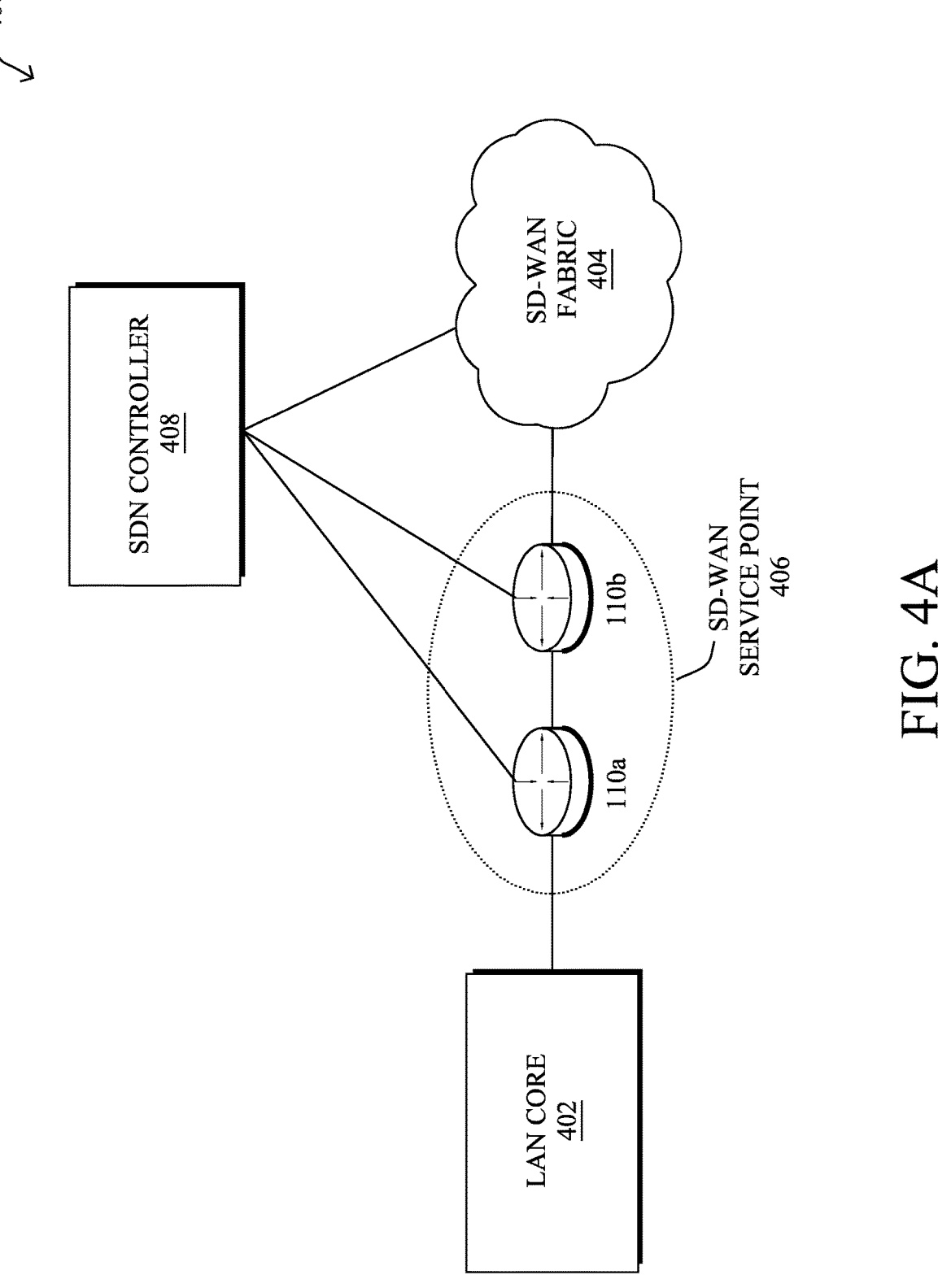
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
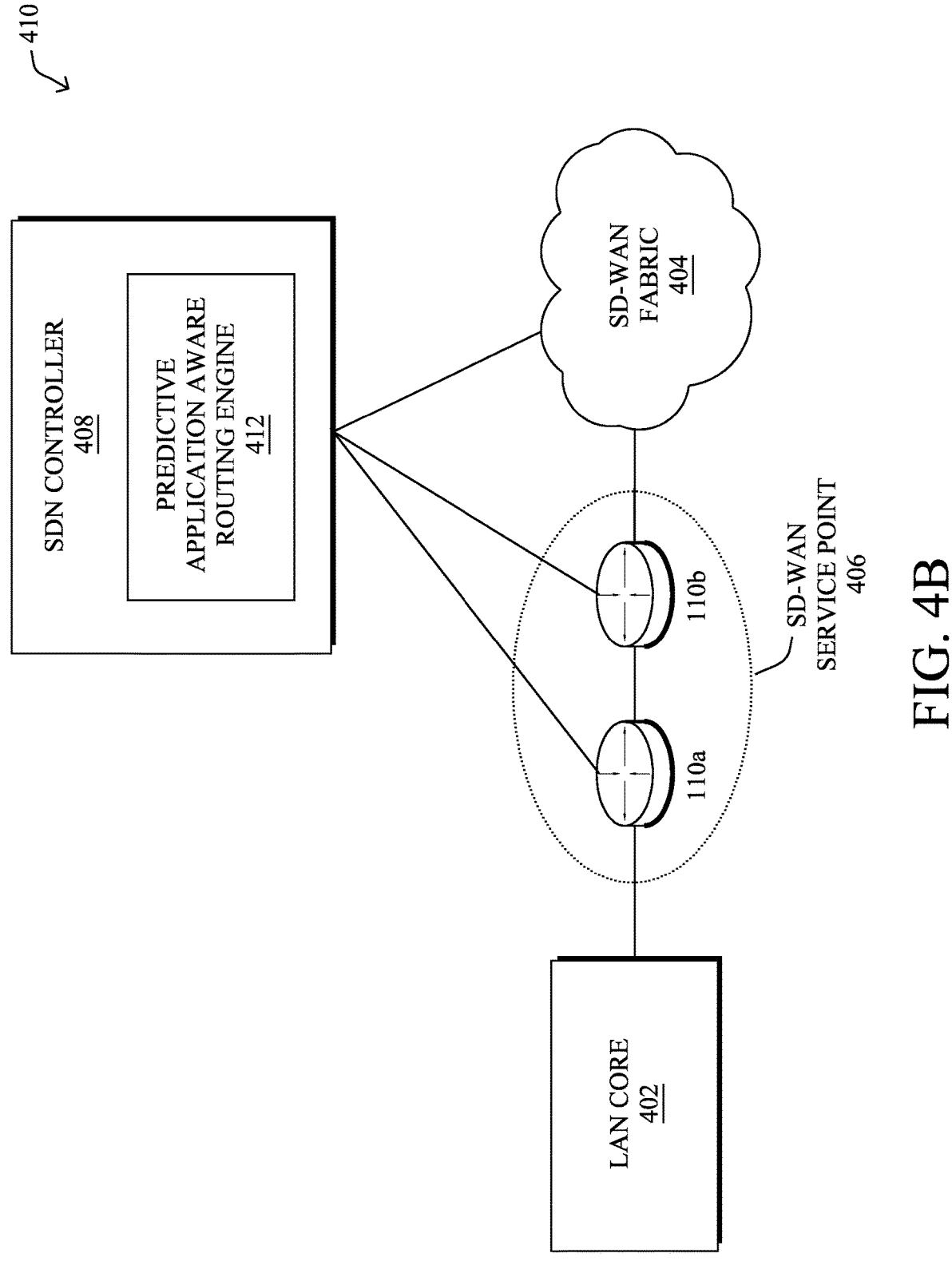

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD- WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, assessing the QoE of web-based applications is extremely difficult, as they often feature many different workflows, each triggering very different actions and fulfilling different objectives. For instance, performing a simple task in an online application (e.g., requesting an absence in Workday™, editing a document in O365, etc.) involves multiple user interactions, and can be done using a variety of approaches, each involving different resources to be fetched by the browser (e.g., via Quick Tasks from the homepage, via the Search field, or via the Menu).

Tremendous effort has gone into making webpages load faster, as the financial stakes keep increasing for online stores, web applications, social networks, and the like, shifting to new type of content (virtual and mixed reality). Entirely new protocols such as QUIC and SPDY have been designed with that goal in mind, and new content delivery mechanisms are explored to make web experience more seamless. The experience of a user in this context is highly dependent on the chosen workflow and how quickly resources can be fetched, which may depend on caching as well.

Most web browsers today feature extremely detailed troubleshooting tools referred to as "network waterfalls" that generate browser waterfall data, i.e., recordings of network activity, which typically include timing information for resource requests sent by the browser for any given session. For the most part, such waterfall data is used only for specific troubleshooting of an application, and collected by users who face disruptions after being requested to do so by support staff for the application. An observation herein is that the waterfall data from a browser may serve as an extremely rich source of data to automatically assess the QoE of web application users.

———Using Network Waterfall Data to Assess the QoE of Web-Based Applications———

The techniques introduced herein allow for the measuring and assessing of the QoE of web-based applications by leveraging browser waterfall data, which are extremely detailed recordings of the browser activity during an application session. Based on such data and an adaptive collection of true user feedback, predictive models s can be trained to predict the QoE of the application, as well as potentially other applications, as well. In some aspects, web browsers may be configured with local agents that analyze the browser waterfall data and decide whether to query the user for an assessment of their perceived QoE. Both the waterfall data and the corresponding label may then be sent to a central element for model training. In other aspects, web-based intelligence agents could also be leveraged, such as those trained on OpenAI's World of Bits (WoB), to collect network traces across many different applications and for many different tasks and workflows. These traces could then be used to pre-train the QoE model, resulting in higher performance. Such agents combined with QoE prediction models could also be used to assess the quality of applications prior to rolling them out to real users or as a testing mechanism.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device obtains browser waterfall data from a web browser of a client that is used to access an online application via a network. The device obtains user feedback from the client indicative of whether a user of the client is satisfied with their experience with the online application. The device trains, using the browser waterfall data and user feedback as training data, a prediction model to predict a quality of experience metric for the online application. The device causes an adjustment to the network based on a prediction by the prediction model.

Figure 5:
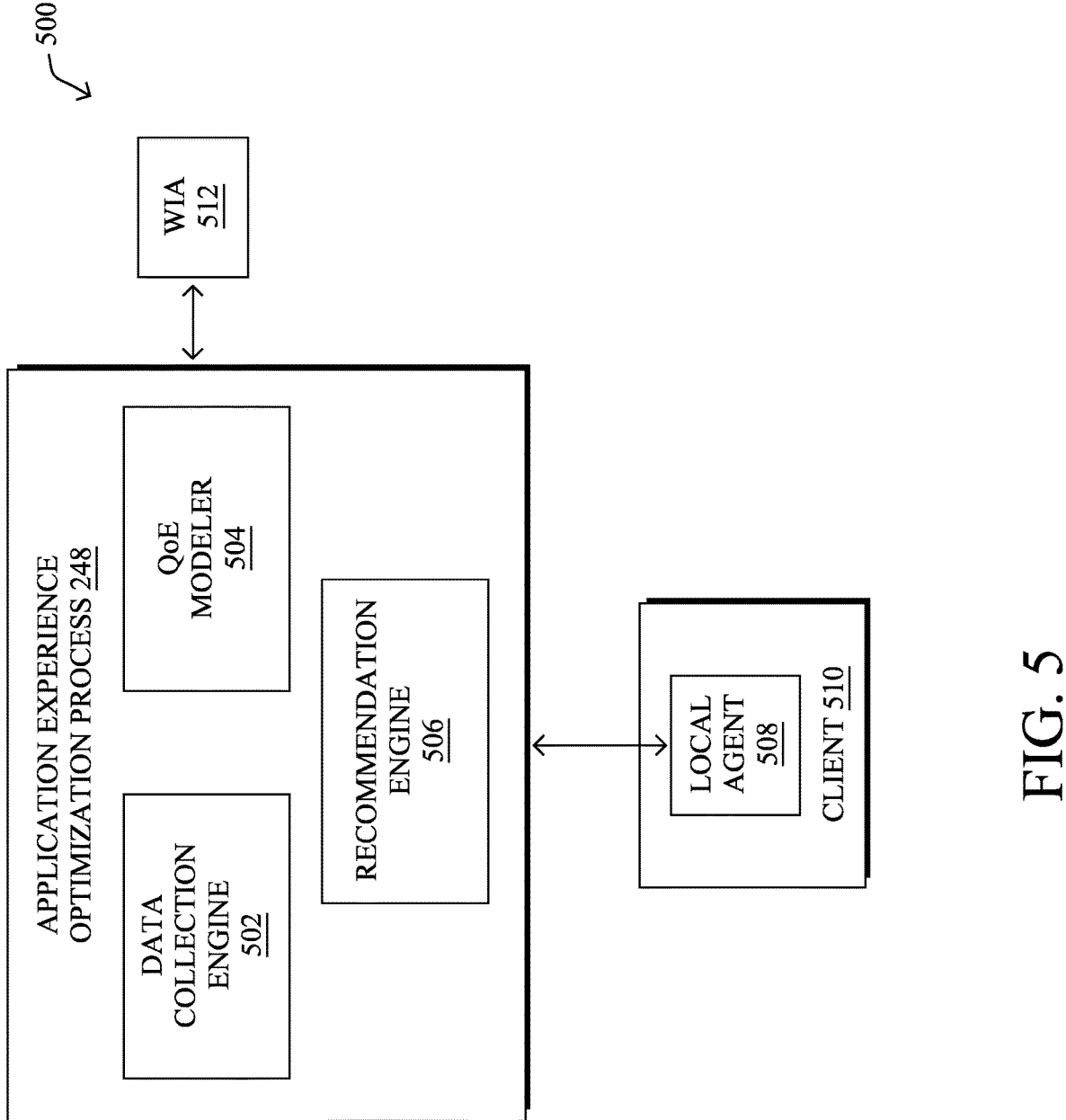
FIG. 5 illustrates an example architecture for using network waterfall data to assess the quality of experience (QoE) of web-based applications.

Operationally, FIG. 5 illustrates an example architecture 500 for using network waterfall data to assess the quality of experience (QoE) of web-based applications, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, a standalone device or service, or the like. In some embodiments, for instance, application experience optimization process 248 may be used to implement a predictive application aware routing engine, such as predictive application aware routing engine 412, or another supervisory service for the network. In other embodiments, application experience optimization process 248 may be used to implement a reactive routing approach in the network.

As shown, application experience optimization process 248 may include any or all of the following components: a data collection engine 502, a QoE modeler 504, and/or a recommendation engine 506. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

According to various embodiments, certain aspects of the techniques herein involve the generation and collection of browser waterfall data. In general, such waterfall data may include a listing of any or all resource requests sent by a web browser of a client, such as client 510 shown, during a session with an online application. For instance, such waterfall data may indicate the resources fetched by the browser during the session, along with the protocol used (e.g., HTTP/2 or HTTP/3, TLS, etc.) the size of a request, the status of a request, the type of document, timing information (e.g., the start and/or end time of the request, which gives a notion of the fetching time), or the like. More advanced analysis of the underlying traffic could, in principle, allow this timing information to be further broken down into network and server delays, as well.

In various embodiments, architecture 500 may include any number of local agents executed by any number of clients, such as local agent 508 executed by client 510, that monitor a configurable set of domains (e.g., workday.com, office.com, github.com) that associated with any number of online applications. In some embodiments, local agent 508 may take the form of a browser plugin for a web browser of client 510. In various embodiments, local agent 508 may initiate a network waterfall function of the web browser, to generate browser waterfall data for session with a particular online application.

In some instances, local agent 508 may also make use of a prediction model that predicts the QoE of that application based on the waterfall data from the browser of client 510. Such a model may yield a continuous estimate of the QoE as the session progresses and the waterfall becomes populated. Alongside the QoE estimate, the model may also provide an estimate of uncertainty or, alternatively, an expected information gain for the said trace: the higher this value, the more valuable a label from the user would be. When the expected information gain or uncertainty goes above a defined threshold, local agent 508 may prompt the user of client 510 to provide user feedback regarding the online application and their experience therewith. Such prompts could take various forms including, but not limited to, a pop-up survey for the user, speaking to the user in a manner similar to that of a virtual assistant, or the like. Regardless of how the feedback is requested by local agent 508, the feedback requests should be as synchronous as possible with the actual experience degradation to be assessed. The user may then reply, either by clicking, writing, or speaking, to local agent 508 and provide an assessment (good/bad, excellent/degraded/bad, 1-5 stars) of their experience with the online application. It should also be noted that simply asking users for their opinions after the loading of a webpage, as a user's interactions with a web application often entails many such actions to complete their intended task.

As shown, local agent 508 (and any other local agents of other clients) may provide the collected browser waterfall data and user feedback to data collection engine 502 either on a pull or push basis. In some cases, local agent 508 may also push waterfall data to data collection engine 502 without labels, as such information could still be used for pre-training models in an unsupervised or self-supervised fashion. More specifically, data collection engine 502 may be centrally hosted (e.g., in the cloud) and collect browser waterfall data from the various local agents across the network. To preserve privacy, the obtained waterfall data may also be anonymized and/or stripped of their payloads, in some embodiments. As a result of this collection, data collection engine 502 will receive data recorded while users perform some tasks on target applications of interest and, optionally, associated user feedback on the perceived QoE while accomplishing the task. In turn, data collection engine 502 may store this data, along with some metadata about the user (country, device, OS, etc.), the application, the kind of task, etc., in a datastore for further consumption by QoE modeler 504.

In various embodiments, QoE modeler 504 is responsible for training a QoE prediction model using the data obtained by data collection engine 502. In some embodiments, such prediction models may be leveraged by the local agents at the clients, such as local agent 508, to decide whether to seek user feedback (e.g., based on the uncertainty or information gain associated with its operations). In general, the prediction model trained by QoE modeler 504 may take as input browser waterfall data and predict the corresponding QoE of the user while performing a given task within an online application.

Since browser waterfall data tends to take the form of a (semi-ordered) set of items, a deep neural network (DNN) based on transformers is very suited to this type of data and could be used for the prediction model. However, other types of machine learning models may also be used for the prediction model, as well. More specifically, browser waterfall data is typically structured much like text: they are mostly sequential, and the ordering has an important meaning that can be learned using machine learning (e.g., some resources loaded early in the waterfall data might determine the nature of the task, which in turn determine the resources that are critical to experience and might be loaded later). In such situations, attention mechanisms may also be important to the proper handling of such input data.

As the number of unlabeled samples will be orders of magnitude larger than labeled ones, QoE modeler 504 may also perform pre-training using unsupervised or self-supervised learning (SSL), like what is done with BERT and other language models. A large variety of strategies can be used, ranging from predicting masked portions of the input browser waterfall data to predicting the next N-number of resources to be loaded and their timings. Alternatively, QoE modeler 504 may use SSL techniques such as Barlow's Twins or Student-Teacher models which are, in principle, more effective than sample reconstruction techniques. Regardless of the pre-training strategy, the resulting model may then be fine-tuned using real user feedback, so that the model generates accurate QoE predictions given the waterfall data used as input to the model. With proper pre-training, even a relatively small number of labels should allow for the training of a prediction model capable of suitable accuracy.

QoE modeler 504 may also be responsible for estimating the uncertainty of the QoE predictions that will be leveraged by the local agent. In this regard, several approaches are possible. If the QoE model is a DNN, a very common technique, often referred to as Monte Carlo Dropout, which consists in activating the dropouts of the model at inference time and computing the variance of the prediction over several runs. Alternatively, QoE modeler 504 could train a Bayesian Neural Network to predict a QoE distribution for each input sample, rather than a scalar QoE metric. The spread of the distribution can then be interpreted as the uncertainty of the prediction. In another embodiment, QoE modeler 504 could train multiple models and use the mean of the predictions of the models as the predicted QoE and the variance of the predictions as the uncertainty estimate. This ensemble learning approach has the advantage of working with any type of prediction model. Regardless, in various embodiments, QoE modeler 504 may send the resulting model back to the local agents, such as local agent 508, can use its predictions and uncertainty estimates to decide whether to query the end user in different circumstances (e.g., as a model update).

In further embodiments, an application programming interface (API) could also be implemented as part of architecture 500 to allow third parties to query the QoE prediction model trained by QoE modeler 504. In such a case, the API may take as a parameter the browser waterfall data (in a specified format) and return the estimated QoE for the online application associated with the waterfall data. This could be used, for instance, by application vendors to test a new version of their software, by enterprises to monitor the satisfaction of their users, or by APM platforms such as AppDynamics, Datadog, etc. to provide a meaningful QoE score. Note that, importantly, this differs significantly from the synthetic tests found in application performance monitoring (APM) platforms today, as they merely run a specific, pre-defined script that consists in a set of HTTP requests and measures things like the Page Load Time (PLT). Here, the model training is based on real user interactions and the prediction model will learn the key resources that are truly meaningful to the completion of a given task within an online application. For instance, if the application displays logos or ads that take longer to load, but are not important to the completion of the task, such aspects may be ignored within architecture 500.

In some embodiments, architecture 500 may also include Web-based Intelligent Agents (WIAs), such as WIA 512, which may be fully or semi-autonomous agents trained to perform tasks on websites and other web-based applications (e.g., booking a trip, etc.). To this end, reinforcement learning is particularly suitable for the formation of such agents. In addition, OpenAI's World of Bits is a platform that allows such agents to complete tasks on the Internet by performing low-level keyboard and mouse actions exactly like a real user. Such an approach has the benefit that WIAs exhibit behaviors that are extremely like that of a real user, as they need to really "see" and "read" resources on the screen before taking the next action. As a result, architecture 500 may leverage WIAs, such as WIA 512, to perform scripted, synthetic tests of an online application and predict what the QoE metric(s) would be, even in the absence of real users interacting with the application being tested. This is extremely useful for the early detection of application issues, testing new releases prior to production rollouts, and automating remediation of application and network issues, among other uses.

In various embodiments, recommendation engine 506 may be responsible for causing remediation actions to be taken in the network, in order to improve the QoE of a specific application. Indeed, modern web applications often trigger hundreds of requests to dozens of different servers and content delivery services, which may be from different providers and in different regions. If non-critical resources are delayed or even unavailable, the user may not even be able to tell (the very nature of browsers and web application is to be extremely fault-tolerant, such that even partial outages might go unnoticed sometimes), but a single critical resource can also prevent the entire page to be displayed in a meaningful way (e.g., a script that is essential to the functioning of the application). To this end, recommendation engine 506 may either implement a recommended change directly (e.g., with our without first receiving an instruction from an administrator to do so) or indirectly, such as by providing the recommendation to the administrator that then implements the recommended change.

In some instances, recommendation engine 506 could leverage explainability methods such as Shapley values or attention weights, to highlight which resources are most important to the end user, and in turn which server caused the issue. Such information is useful to both the application owner (which can then quickly zero in on the problem in their infrastructure) and network operators (which can identify the paths involved in fetching such resources). In some embodiments, recommendation engine 506 may also integrate with APM platforms such as Datadog, NewRelic, etc., or network visibility tools such as ThousandEyes, by creating new synthetic tests to the said server or bringing up specific details related to this server.

Figure 6:
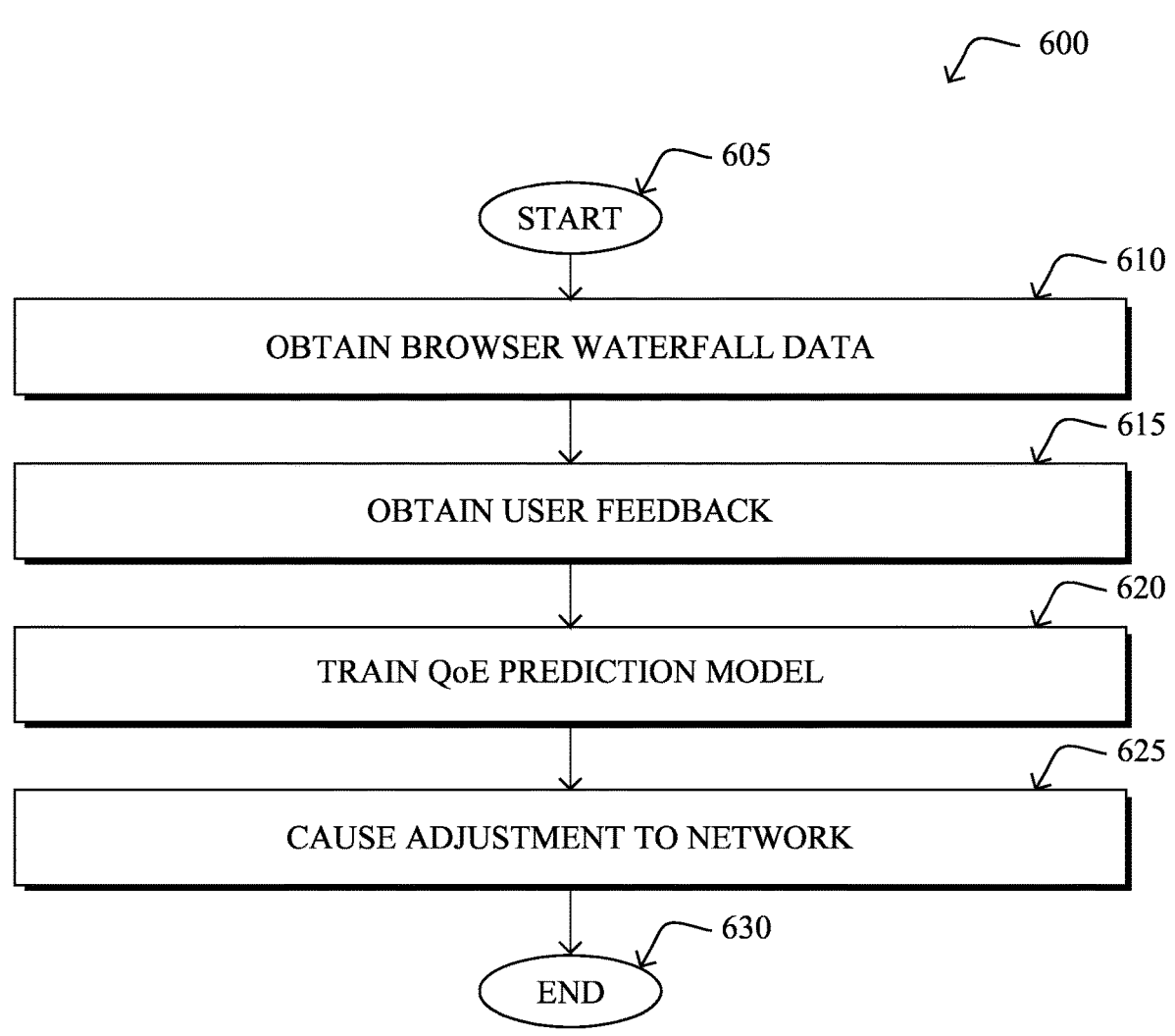
FIG. 6 illustrates an example simplified procedure for using network waterfall data to assess the quality of experience (QoE) of web-based applications.

FIG. 6 illustrates an example simplified procedure 600 (e.g., a method) for using network waterfall data to assess the quality of experience (QoE) of web-based applications, in accordance with one or more embodiments described herein. For example, a non-generic, specifically configured device (e.g., device 200) may perform procedure 600 by executing stored instructions (e.g., application experience optimization process 248). The procedure 600 may start at step 605, and continues to step 610, where, as described in greater detail above, the device may obtain browser waterfall data from a web browser of a client that is used to access an online application via a network. In some embodiments, the browser waterfall data indicates resource requests sent by the web browser during a session with the online application, protocol information for the resource requests, and timing information for the resource requests. In other embodiments, the device may also obtain data from an agent that autonomously interacts with the online application, wherein the prediction model is trained at least in part on the data obtained from the agent. In one embodiment, the browser waterfall data is generated by a plugin of the web browser. In another embodiment, the online application is a software-as-a-service (SaaS) application.

At step 615, as detailed above, the device may obtain user feedback from the client indicative of whether a user of the client is satisfied with their experience with the online application. In some embodiments, the user feedback is based on satisfaction ratings provided by the user regarding the online application. In further embodiments, the client executes a local prediction model that prompts the user of the client for the user feedback based on an uncertainty associated with quality of experience metrics predicted by that model for the browser waterfall data.

At step 620, the device may use the browser waterfall data and user feedback as training data, a prediction model to predict a quality of experience metric for the online application, as described in greater detail above. In some embodiments, the device may use browser waterfall data associated with a second online application as input to the prediction model to predict a quality of experience metric for the second online application and provide the QoE metric for the second online application for display.

At step 625, as detailed above, the device may cause an adjustment to the network based on a prediction by the prediction model. In some embodiments, the device may update the local prediction model with the prediction model trained by the device. In further embodiments, the adjustment is made to one or more resources associated with the resource requests indicated by the browser waterfall data.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for using network waterfall data to assess the quality of experience (QoE) of web-based applications, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

obtaining, by a device, browser waterfall data from a web browser of a client that is used to access an online application via a network;

obtaining, by the device, user feedback from the client indicative of whether a user of the client is satisfied with their experience with the online application, wherein the client executes a local prediction model that prompts the user of the client for the user feedback based on an uncertainty associated with quality of experience metrics predicted by the local prediction model for the browser waterfall data;

training, by the device and using the browser waterfall data and the user feedback as training data, a prediction model to predict a quality of experience metric for the online application;

updating, by the device, the local prediction model with the prediction model, wherein the prediction model has different uncertainty associated with predictions for the quality of experience metric for the online application; and causing, by the device, an adjustment to the network based on a prediction by the prediction model.

2. The method as in claim 1, wherein the user feedback is based on satisfaction ratings provided by the user regarding the online application.

3. The method as in claim 1, wherein the browser waterfall data indicates resource requests sent by the web browser during a session with the online application, protocol information for the resource requests, and timing information for the resource requests.

4. The method as in claim 3, wherein the adjustment is made to one or more resources associated with the resource requests.

5. The method as in claim 1, further comprising:

obtaining, by the device, data from an agent that autonomously interacts with the online application, wherein the prediction model is trained at least in part on the data obtained from the agent.

6. The method as in claim 1, further comprising:

using browser waterfall data associated with a second online application as input to the prediction model to predict a quality of experience metric for the second online application; and providing the quality of experience metric for the second online application for display.

7. The method as in claim 1, wherein the browser waterfall data is generated by a plugin of the web browser.

8. The method as in claim 1, wherein the online application is a software-as-a-service (SaaS) application.

9. An apparatus, comprising:

one or more network interfaces;

a processor coupled to the one or more network interfaces and configured to execute one or more processes; and a memory configured to store a process that is executable by the processor, the process when executed configured to:

obtain browser waterfall data from a web browser of a client that is used to access an online application via a network;

obtain user feedback from the client indicative of whether a user of the client is satisfied with their experience with the online application, wherein the client executes a local prediction model that prompts the user of the client for the user feedback based on an uncertainty associated with quality of experience metrics predicted by that model for the browser waterfall data;

train, using the browser waterfall data and the user feedback as training data, a prediction model to predict a quality of experience metric for the online application;

update the local prediction model with the prediction model, wherein the prediction model has different uncertainty associated with predictions for the quality of experience metric for the online application; and cause an adjustment to the network based on a prediction by the prediction model.

10. The apparatus as in claim 9, wherein the user feedback is based on satisfaction ratings provided by the user regarding the online application.

11. The apparatus as in claim 9, wherein the browser waterfall data indicates resource requests sent by the web browser during a session with the online application, protocol information for the resource requests, and timing information for the resource requests.

12. The apparatus as in claim 11, wherein the adjustment is made to one or more resources associated with the resource requests.

13. The apparatus as in claim 9, wherein the process when executed is further configured to:

obtain data from an agent that autonomously interacts with the online application, wherein the prediction model is trained at least in part on the data obtained from the agent.

14. The apparatus as in claim 9, wherein the process when executed is further configured to:

use browser waterfall data associated with a second online application as input to the prediction model to predict a quality of experience metric for the second online application; and provide the quality of experience metric for the second online application for display.

15. The apparatus as in claim 9, wherein the browser waterfall data is generated by a plugin of the web browser.

16. A tangible, non-transitory, computer-readable medium storing program instructions that cause a device to execute a process comprising:

obtaining, by a device, browser waterfall data from a web browser of a client that is used to access an online application via a network;

obtaining, by the device, user feedback from the client indicative of whether a user of the client is satisfied with their experience with the online application, wherein the client executes a local prediction model that prompts the user of the client for the user feedback based on an uncertainty associated with quality of experience metrics predicted by that model for the browser waterfall data;

training, by the device and using the browser waterfall data and the user feedback as training data, a prediction model to predict a quality of experience metric for the online application;

updating, by the device, the local prediction model with the prediction model, wherein the prediction model has different uncertainty associated with predictions for the quality of experience metric for the online application; and causing, by the device, an adjustment to the network based on a prediction by the prediction model.

* * * * *